US010901080B2

(12) United States Patent
Nagy et al.

(10) Patent No.: US 10,901,080 B2
(45) Date of Patent: Jan. 26, 2021

(54) TRAFFIC MONITORING AND PREDICTIVE ANALYSIS SYSTEM FOR USE WITH VEHICLE STOP INDICATOR SYSTEMS

(71) Applicant: FLEETMIND SEON SOLUTIONS INC., Coquitlam (CA)

(72) Inventors: Robert Nagy, Ottawa (CA); David Black, New Vancouver (CA); Tomas Brodsky, Cortlandt, NY (US); Rachel Wong, Burnaby (CA); Bradley Edmund Tyrone Green, Coquitlam (CA)

(73) Assignee: FLEETMIND SEON SOLUTIONS INC., Coquitlam (CA)

( * ) Notice: Subject to any disclaimer, the term of this patent is extended or adjusted under 35 U.S.C. 154(b) by 0 days.

(21) Appl. No.: 16/172,214

(22) Filed: Oct. 26, 2018

(65) Prior Publication Data
US 2020/0132831 A1    Apr. 30, 2020

(51) Int. Cl.
*G01S 13/88* (2006.01)
*G08G 1/04* (2006.01)
(Continued)

(52) U.S. Cl.
CPC ............ *G01S 13/886* (2013.01); *G01S 13/58* (2013.01); *G01S 13/867* (2013.01);
(Continued)

(58) Field of Classification Search
CPC ...... G01S 13/886; G01S 13/58; G01S 13/867; G01S 13/931; G08G 1/0175; G08G 1/04; G08G 1/048
(Continued)

(56) References Cited

U.S. PATENT DOCUMENTS 7,783,403 B2    8/2010  Breed
9,632,507 B1 *  4/2017  Korn .................... G05D 1/0293
(Continued)

FOREIGN PATENT DOCUMENTS

WO    2017065678 A1    4/2017

OTHER PUBLICATIONS

The International Search Report of the International Searching Authority for International Application No. PCT/CA2019/000151, 15 pages.

*Primary Examiner* — Daryl C Pope
(74) *Attorney, Agent, or Firm* — Michael D. Lazzara; Leech Tishman Fuscaldo & Lampl

(57) ABSTRACT

A system is provided for monitoring and predicting traffic conditions in a vicinity of a system vehicle having a stop indicator system. The system may include one or more radar modules programmed to detect target vehicles traveling within a predetermined radar detection area near the system vehicle. The radar modules may be further programmed to detect signals associated with target vehicles and generate signals indicative of alert conditions. The radar modules may be programmed to execute various algorithms which generate alert condition signals in response to determining and analyzing a current distance, a braking distance, and/or a velocity of the target vehicle detected in the radar detection area. The system can communicate appropriate alert notifications in response to the generated alert condition signals.

24 Claims, 10 Drawing Sheets

(51) Int. Cl.
  *G08G 1/017* (2006.01)
  *G01S 13/58* (2006.01)
  *G01S 13/931* (2020.01)
  *G01S 13/86* (2006.01)
  *G08G 1/048* (2006.01)

(52) U.S. Cl.
  CPC .......... *G01S 13/931* (2013.01); *G08G 1/0175* (2013.01); *G08G 1/04* (2013.01); *G08G 1/048* (2013.01)

(58) Field of Classification Search
  USPC ................. 340/933, 937, 438, 539.1, 539.11
  See application file for complete search history.

(56) References Cited

U.S. PATENT DOCUMENTS

| | | | |
|---|---|---|---|
| 9,718,405 B1 | 8/2017 | Englander et al. | |
| 2003/0139882 A1* | 7/2003 | Miller | B60R 21/013 |
| | | | 701/301 |
| 2005/0278088 A1* | 12/2005 | Thorner | B60Q 9/005 |
| | | | 701/28 |
| 2010/0104138 A1* | 4/2010 | Fardi | H04N 7/181 |
| | | | 382/106 |
| 2012/0277989 A1* | 11/2012 | Zeller | B60W 50/14 |
| | | | 701/301 |
| 2014/0350836 A1* | 11/2014 | Stettner | G01S 17/931 |
| | | | 701/301 |
| 2016/0355179 A1 | 12/2016 | Cannella et al. | |
| 2018/0050673 A1* | 2/2018 | D'sa | B60W 30/0953 |
| 2018/0165527 A1 | 6/2018 | Park et al. | |
| 2019/0180629 A1* | 6/2019 | Kim | G08G 1/166 |

\* cited by examiner

| Target Distance from the stop line (feet) | Approach Speed (mph) |
|---|---|
| Warning | |
| < 160 | > 51 |
| < 140 | > 46 |
| < 120 | > 41 |
| < 100 | > 35 |
| < 80 | > 27 |
| < 60 | > 16 |
| Alarm | |
| < 100 | > 49 |
| < 80 | > 43 |
| < 60 | > 38 |
| < 40 | > 31 |
| < 20 | > 22 |

FIG. 8

TRAFFIC MONITORING AND PREDICTIVE ANALYSIS SYSTEM FOR USE WITH VEHICLE STOP INDICATOR SYSTEMS

FIELD OF THE INVENTION

Various embodiments of the present invention generally relate to systems, processes, devices, and techniques for predicting and monitoring hazardous conditions within the vicinity of a vehicle. In particular embodiments, the invention may employ radar technology to facilitate predicting and monitoring hazardous traffic conditions within the vicinity of vehicles equipped with stop indicator systems.

BACKGROUND

Vehicle traffic on highways, streets, and other travel routes can present hazards to cars, buses, bikes, passengers, and pedestrians, among others who use the traffic system. For example, school students boarding and disembarking from buses and similar passenger vehicles are often vulnerable to accidents caused by the surrounding traffic environment. Many buses use conventional stop indicator systems, stop arms, and/or visual warning systems to attempt to mitigate the dangers of traffic conditions when passengers enter or exit the bus. However, despite these safety measures, accidents can still be caused by vehicle traffic traveling at excessive speed and/or in close proximity to the bus during loading or unloading operations. Accordingly, traffic conditions remain a significant threat to the safety and welfare of bus passengers, especially students on school buses, for example.

Therefore, enhanced tools and techniques are needed to monitor the traffic conditions around vehicles such as school buses. In addition, technical solutions are needed for predicting the significance of threats arising from other vehicles traveling too near the bus and/or at too high a rate of speed and which seem unlikely to be able to stop, especially at crucial times when passengers are entering or exiting the bus.

SUMMARY

In various embodiments, a system is provided for monitoring and predicting traffic conditions in a vicinity of a system vehicle. The system may include one or more radar modules programmed to detect at least one target in a first direction within a predetermined radar detection area. The radar module may be programmed to: detect signals associated with a target vehicle traveling through the radar detection area; generate signals indicative of alert conditions associated with the target vehicle traveling through the radar detection area; and communicate the alert condition signals to an alarm module. The alarm module of the system may be programmed to: receive the alert condition signals communicated from the radar modules; communicate with at least a portion of a stop indicator system operatively associated with the system vehicle; and, generate at least one alert event communication (e.g., audible, visual, or other kind of notification) in response to at least one of the received alert condition signals.

The defined radar detection area can be divided into multiple zones including mounting offset zones, safety zones, and braking zones. Each radar module can be programmed to generate an alert condition signal in response to detecting a target (e.g., a vehicle) in one of these zones and/or the velocity of the target in the zone. Also, the radar modules can be programmed to generate alert condition signals in response to determining a braking distance for a target vehicle detected in the radar detection area. In certain embodiments, the radar modules may be programmed to execute various algorithms which generate alert condition signals in response to determining and analyzing a current distance, a braking distance, and/or a velocity of the target vehicle detected in the radar detection area.

In other embodiments, the alarm module of the system can be programmed to communicate wirelessly with the braking computer system of the target vehicle, such as to recommend applying the brakes to the driver of the target vehicle. Also, a combination of a camera with visual recognition software can be used to determine a type of vehicle for the target vehicle traveling through the radar detection area. In another aspect of the invention, the alarm module can be programmed to communicate alert condition information wirelessly to at least one wireless device within the vicinity of the vehicle.

BRIEF DESCRIPTION OF THE FIGURES

Various embodiments of the present invention are described with reference to the following figures, wherein like reference numerals refer to like parts throughout the various views:

FIG. 8 shows a data table structure including potential input data for certain embodiments of the algorithms described herein.

DESCRIPTION

Figure 1:
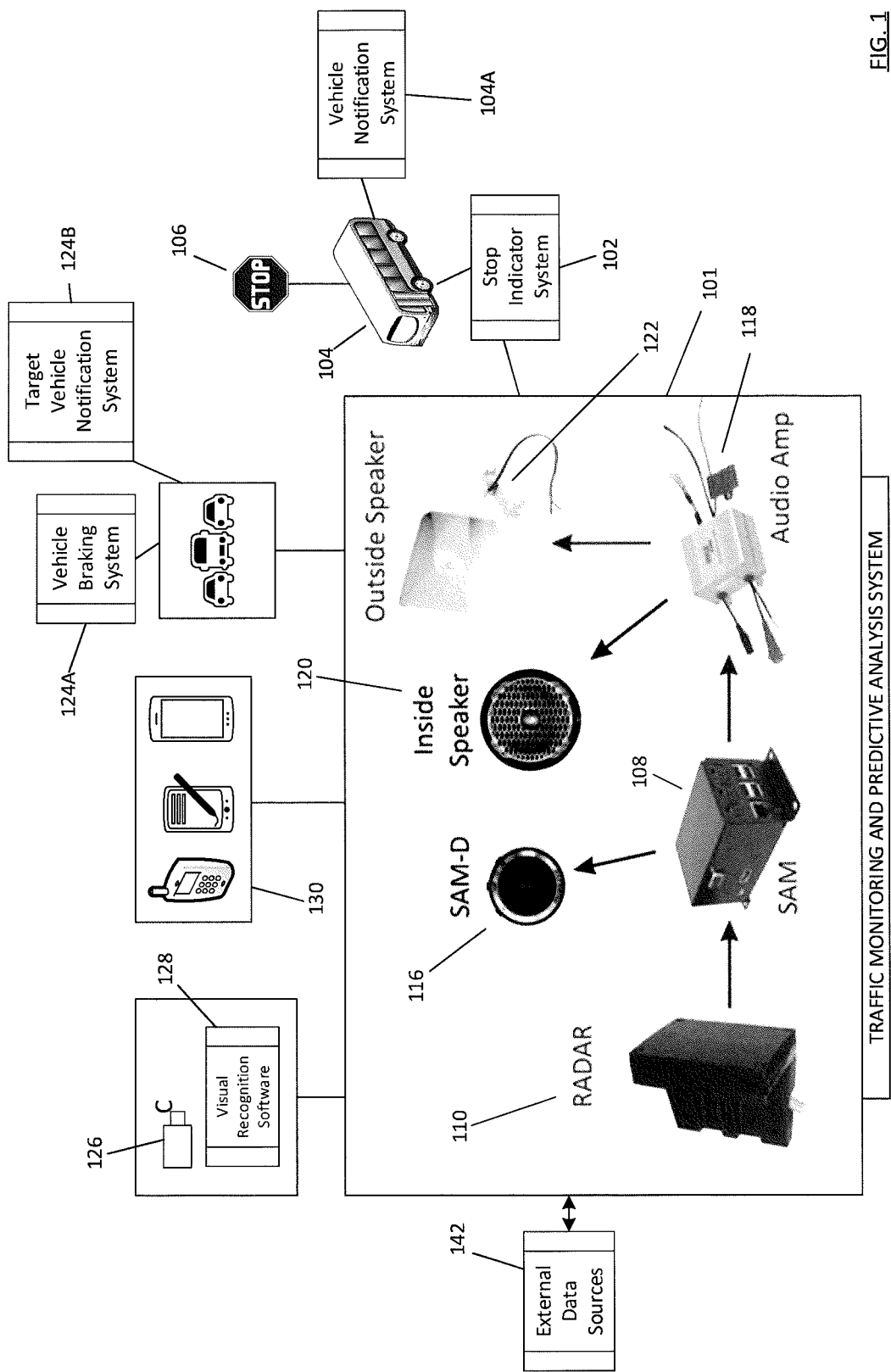
FIG. 1 schematically illustrates an example of a traffic monitoring and predictive analysis system.
Figure 2:
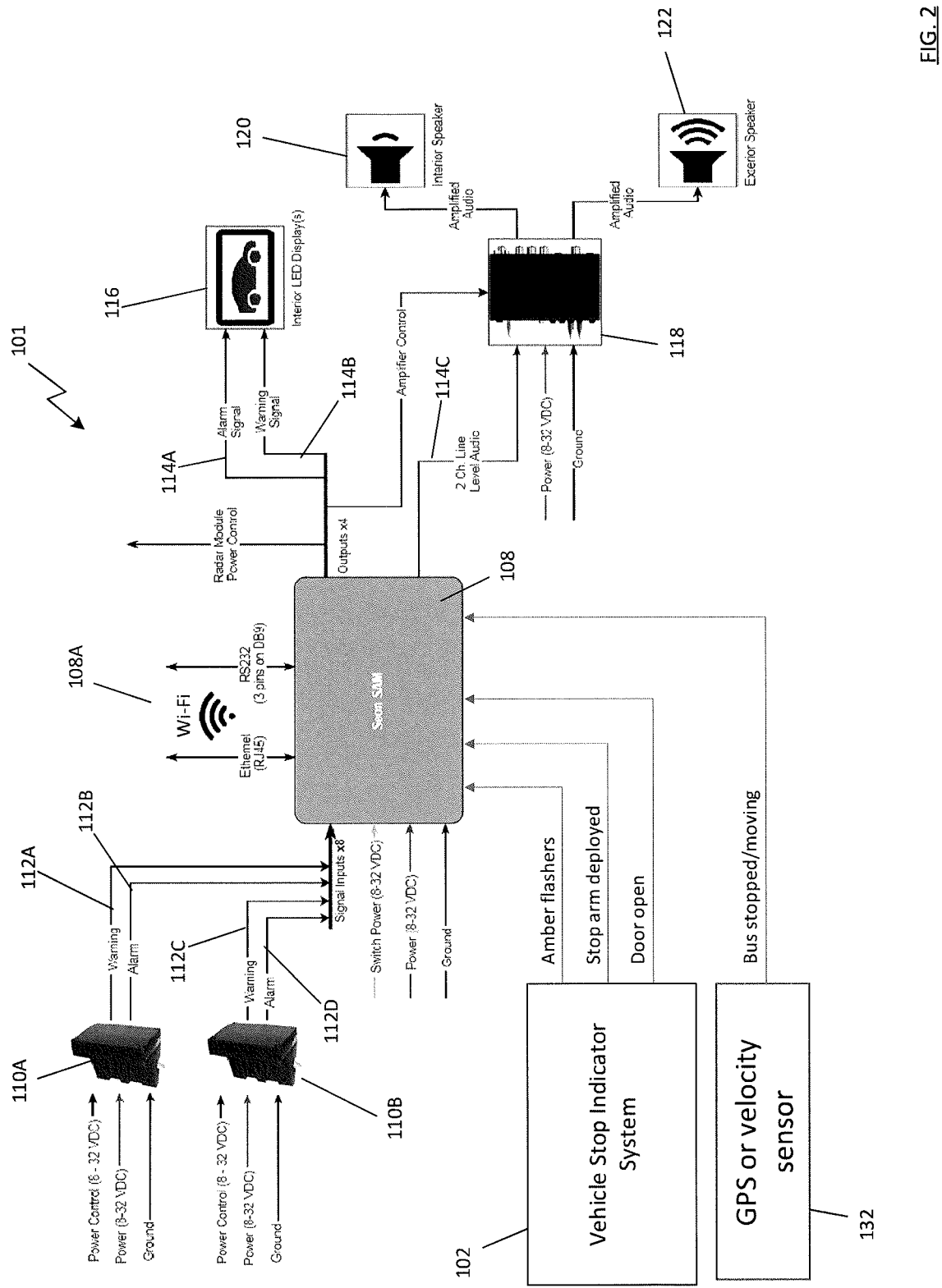
FIG. 2 displays more detailed features and functions of the traffic monitoring and predictive analysis system shown in FIG. 1.
Figure 3:
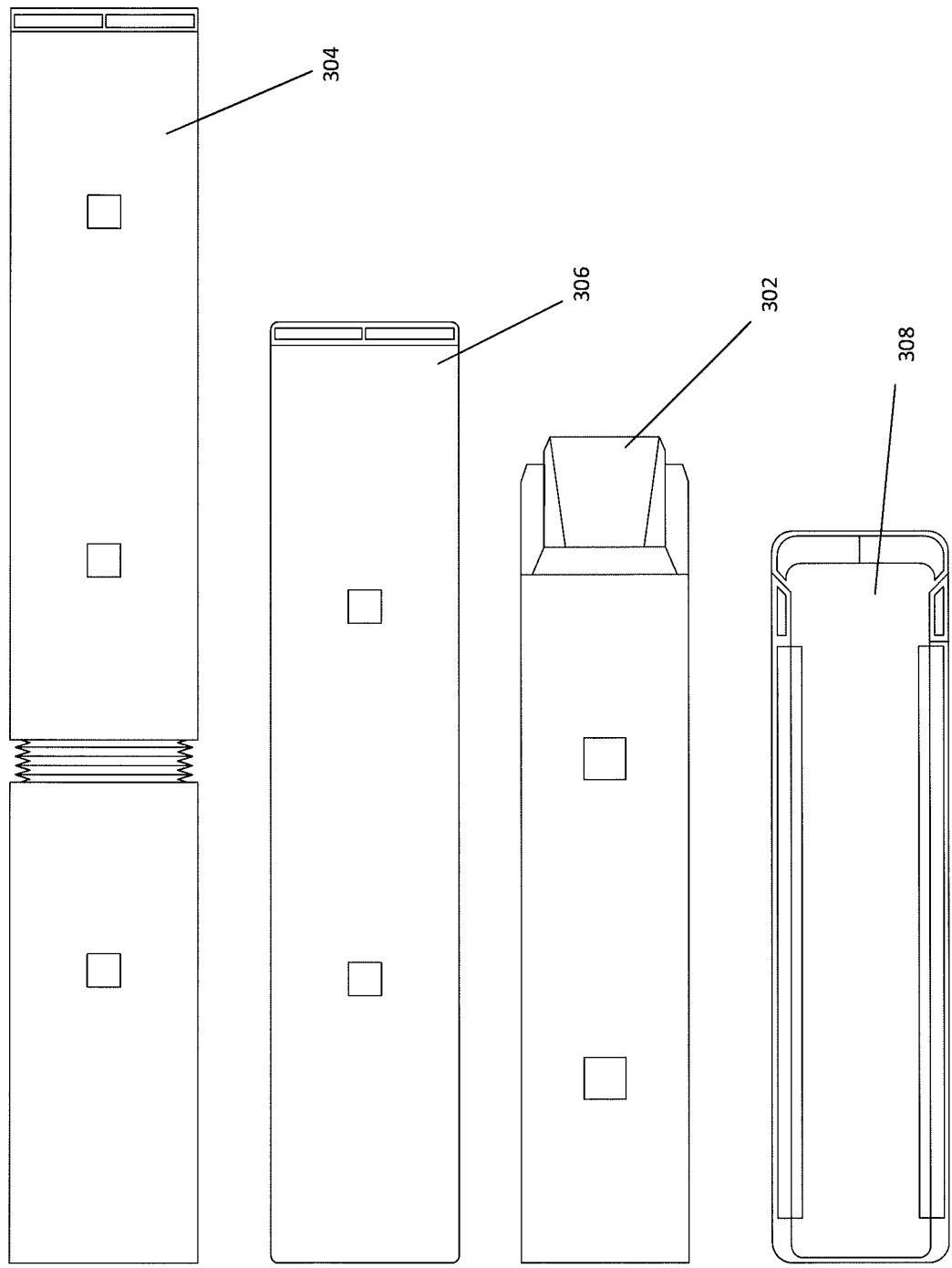
FIG. 3 includes examples of various vehicles which can be employed in connection with certain embodiments of the present invention.

FIGS. 1 and 2 schematically illustrate an overview of one example of a traffic monitoring and predictive analysis system 101 structured in accordance with certain embodiments of the invention. In this example, the system 101 can be configured for operative association and communication with a conventional stop indicator system 102 of a system vehicle 104. In various embodiments, the stop indicator system 102 may include visual alert signals (e.g., amber and red flashing lights), and/or a stop arm 106 which extends from the vehicle 104 during boarding or offloading passengers to/from the vehicle 104. In certain embodiments, the stop indicator system 102 does not include the stop arm 106. With reference to FIG. 3, the vehicle 104 may be a variety of different types of vehicles such as a school bus 302, an articulated bus 304, a metro bus 306, or a tour bus 308, for example. In other embodiments, the system 101 may be configured for operation with many other kinds of vehicles 104 such as ambulances, fire trucks, construction vehicles, passenger trains, water craft, and other vehicles 104 which employ a stop indicator system 102 or which might otherwise benefit from use of the systems, tools, and techniques described herein.

The system 101 may include an alarm module 108 (herein sometimes referred to as a "SAM" module) programmed to receive data and signals communicated by one or more radar modules 110A, 110B. In various embodiments, the SAM module 108 may include a combination of a processor with hardware, software, firmware, and/or logic circuitry programmed to process signals, to control power supplied to different components of the system 101, and/or to direct the functions or tasks of other components in the system 101, as shown in FIG. 2. In one embodiment, the SAM module 108 may include a single board computer (SBC—e.g., a trade-designated "Raspberry Pi" device) combined with a custom I/O board configured to handle input and output signals. In addition, the SAM module 108 may be configured for direct interaction and communication with the stop indicator system 102 of the vehicle 104. The SAM module 108 may collect and process signals indicative of events such as when amber lights of the stop indicator system 102 have been activated, when a door of the vehicle 104 is in the process of opening or closing, when red lights of the system 102 have been activated, or when the stop arm 106 has been engaged or disengaged, among other events. In other embodiments, the alarm module 108 may be programmed to engage in one or more kinds of wireless communication connections 108A, involving ethernet, Bluetooth, and WIFI, for example, or other kinds of wireless communication protocols.

The radar modules 110A, 110B may be configured and directed to transmit and receive radio waves to/from a predetermined radar detection area (see below) which can be defined in response to the vicinity or environment in which the vehicle 104 travels, and especially at times when the vehicle 104 boards or off-loads passengers. In various embodiments, the radar module 110 may include a combination of a processor with hardware, software, firmware, and/or logic circuitry programmed to process signals, to transmit radio waves into a radar detection area, and/or to receive radio waves reflected back to the radar module 110 from a radar detection area. In general, the radar modules 110 provide the system 101 with the capability to detect and monitor other vehicles traveling in the vicinity of the vehicle 104 which may be unlikely to brake or stop during activation of the stop indicator system 102. In various embodiments, the radar modules 110 can be programmed to detect and communicate signals to the SAM module 108 indicative of alert conditions within the radar detection area which represent a "warning" condition, an "alarm" condition, a "violation" condition, and/or other alert conditions with respect to the presence or movement of other vehicles through the radar detection area. In certain aspects, these alert conditions may be determined based on the proximity, speed, acceleration, physical appearance, and/or other attributes of other vehicles within the radar detection area defined for the vehicle 104.

In response to receiving and processing signals 112A-112D communicated from the radar module 110, the SAM module 108 may accordingly communicate alarm signals 114A, warning signals 114B, audio signals 114C, or other alert condition signals to other components of the system 101, as shown in FIG. 2. For example, alert condition signals 114A, 114B may be communicated to a display screen 116 positioned within the interior of the vehicle 104, such as in a location where a driver of the vehicle 104 can see visual information indicative of the communicated alert condition. In another example, the audio signal 114C can be communicated through an audio amplifier 118 to one or both of an interior speaker 120 and/or an exterior speaker 122. The interior speaker 120 can be installed within an interior of the vehicle 104, for example, to broadcast information regarding alert conditions to the driver and passengers of the vehicle 104. The exterior speaker 122 can be positioned at a location on the exterior of the vehicle to notify anyone in the environment surrounding the vehicle 104, such as boarding or offloading passengers or other vehicles, of the alert condition. In certain embodiments, the alarm module 108 may communicate with or provide feedback information to the vehicle stop indicator system 102, such as to notify or activate a flashing light of the vehicle 104, to activate the stop arm 106, or to open or close a door of the vehicle 104, for example. In other embodiments, the alarm module 108 may communicate with one or more vehicle notification systems 104A of the vehicle 104, in association with a detected alert condition, for example. A typical vehicle notification system 104A may include a horn, speakers, interior lights, computer screen, or other devices within the vehicle 104 which could provide a visual or audible notification to a driver of the vehicle 104.

In other embodiments, in addition to audible or visual notifications, other types of alert event communications may be generated in response to receiving the alert condition signals. For example, an alert event communication may involve recording data or video associated with activity in the vicinity of the vehicle 104. Such captured data or video might be used by law enforcement to issue traffic citations or tickets to drivers of target vehicles, for example, when a legal violation has occurred. In another example, the alert event communication may involve wirelessly sending a text, e-mail, or perhaps causing a vibration on the mobile phone 130 of a user.

Figure 4:
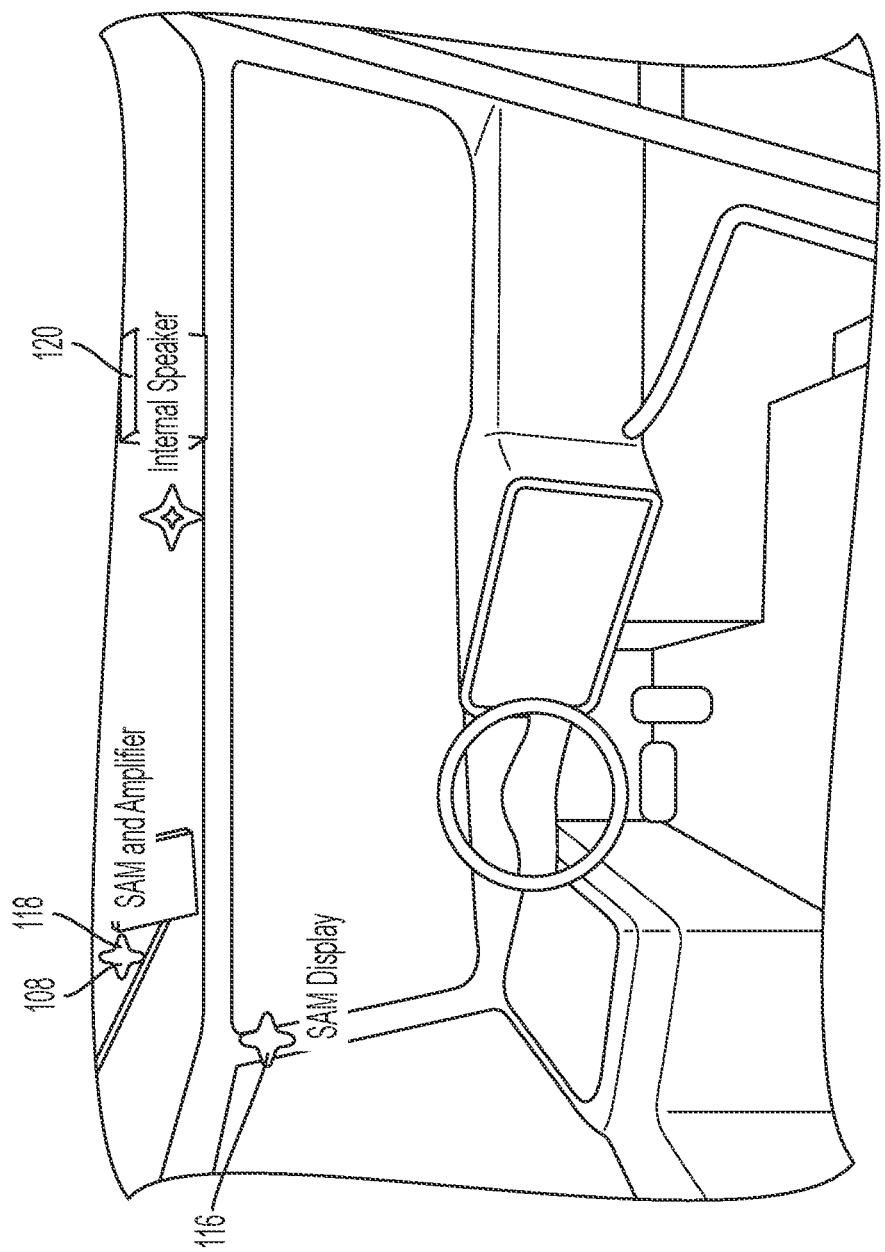
FIG. 4 includes a picture of the interior of a vehicle with highlighted locations for installation of certain components of a traffic monitoring and predictive analysis system.
Figure 5:
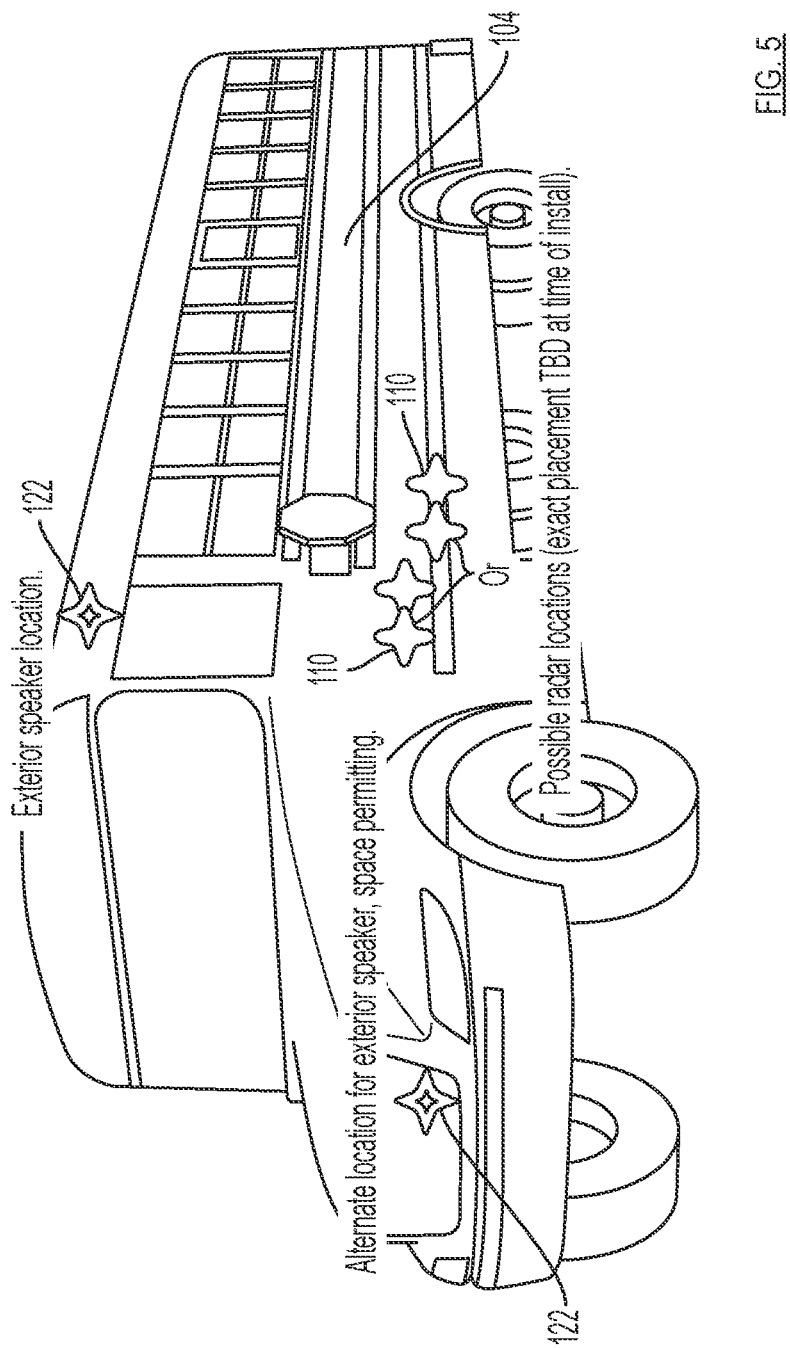
FIG. 5 includes a picture of the exterior of a vehicle with highlighted locations for installation of certain components of a traffic monitoring and predictive analysis system.

FIG. 4 illustrates one example of placement of various components of the system 101 within the interior of a vehicle 104 which is a school bus. Highlighted potential placement positions are shown for the SAM module 108, the screen display 116, and the interior speaker 120. Likewise, FIG. 5 illustrates one example of placement of various components of the system 101 on the exterior of a vehicle 104 which is a school bus. Alternative potential placement positions have been highlighted for the exterior speaker 122 and the radar module 110, for example.

In various embodiments, the system 101 can be programmed to communicate wirelessly with different types of vehicle braking computer systems 124, including such systems that might be installed within target vehicles traveling in the vicinity of the vehicle 104. In one embodiment, the system 101 can communicate alert condition information directly to the computer system of another vehicle to recommend or direct that the other vehicle activate its braking system, for example, to avoid an accident with the vehicle 104 or its passengers. In other embodiments, the system 101 may communicate wirelessly with one or more vehicle notification systems 124B of a target vehicle, in association with a detected alert condition, for example. These vehicle notification systems 124B may include a horn, speakers, interior lights, computer screen, or other devices within the target vehicle which could provide a visual or audible notification to a driver of the target vehicle. Such communications may be vehicle-to-vehicle (V2V), vehicle-to-infrastructure (V2I), or vehicle-to-everything (V2X) communications conducted on a wireless network in which vehicles send messages to each other and/or to other devices or nodes with information about their status and activity. Such data might include speed, location, direction of travel, braking, and loss of stability, among others. For example, the target vehicle may communicate data derived from its stability control system about current road conditions or weather conditions and the target vehicle's ability to stop. V2V technology may use dedicated short-range communications (DSRC) in a mesh network, meaning every connected node (e.g., bus, car, smart traffic signal, etc.) might be configured to send, capture and retransmit signals to other nodes within the network.

In certain embodiments, the system 101 may employ a digital camera 126 and visual recognition software 128 to determine the nature or type of the other vehicle approaching the vehicle 104. The visual recognition software 128 can be programmed to analyze image data captured by the camera 126 to determine a type of vehicle for the target vehicle traveling through the radar detection area. For example, such visual recognition software may determine that the other vehicle is a large truck with potentially greater mass and a longer stopping distance than an automobile. In this example, the system 101 may adjust its processing of the alert condition signals accordingly, such as by issuing an alarm or warning communication earlier than it would have otherwise for a smaller vehicle. In another embodiment, the system 101 may be programmed to communicate alert condition information wirelessly to one or more wireless devices 130, such as mobile phones, smart phones, laptops, of other devices of people within the vicinity of the vehicle 104, for example.

Figure 6:
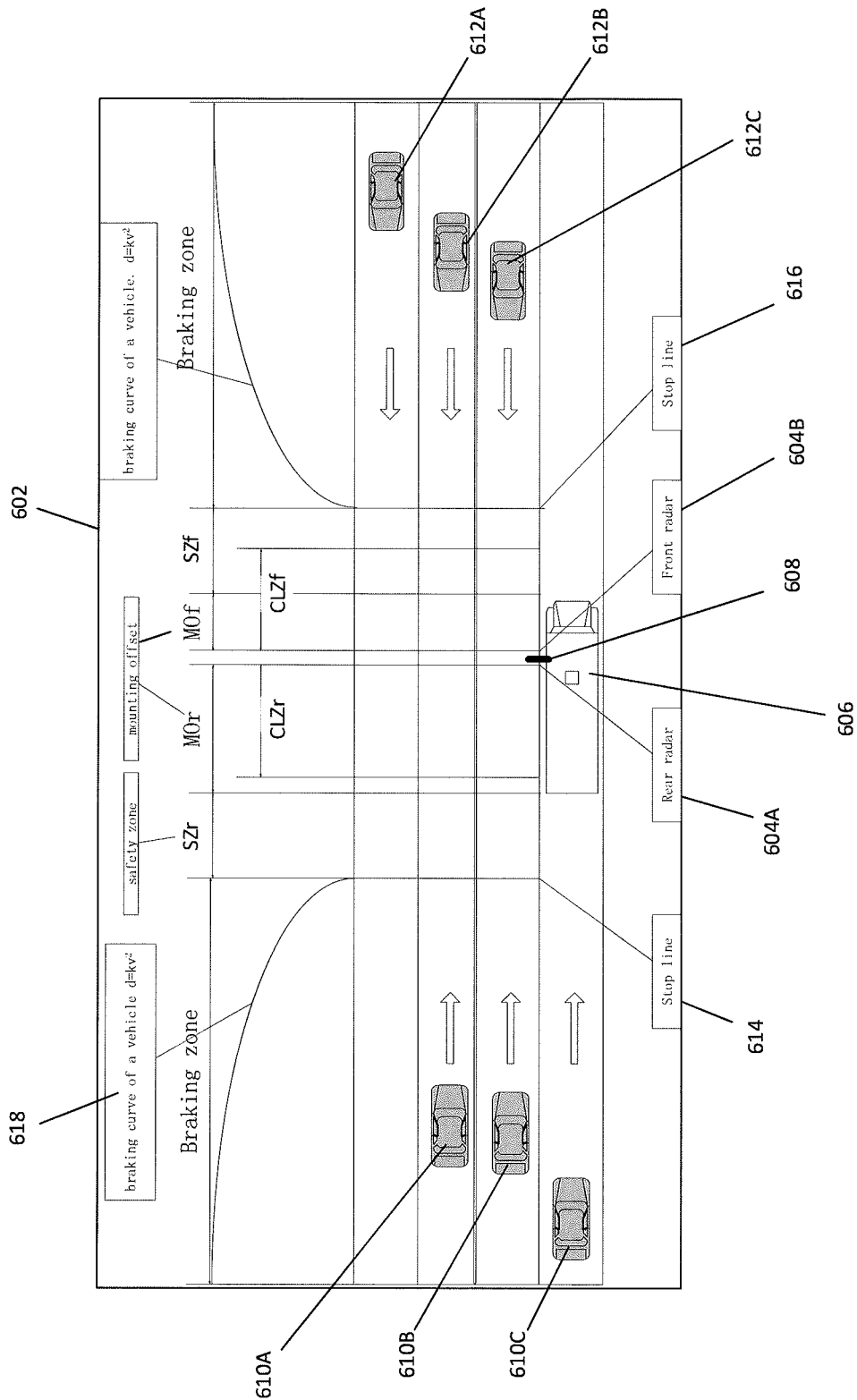
FIG. 6 includes an example of a radar detection area applicable to certain embodiments of the present invention.

FIG. 6 schematically illustrates one example of a radar detection area 602 which can be generated for use by various embodiments of the traffic monitoring and predictive analysis system described herein. In this example, two radar modules 604A, 604B have been mounted outside a vehicle 606 (e.g., school bus) near a stop arm 608. Each radar module 604A, 604B monitors traffic in one direction— forward for the front radar 604B and backward for the rear radar 604A. Radar module 604A can continuously measure a distance and speed of vehicles 610A-610C approaching from the rear of the vehicle 606. Likewise, radar module 604B may continuously measure a distance and speed of vehicles 612A-612C approaching the front of the vehicle 606. The radar modules 604A, 604B can be programmed and configured to generate warnings, alarms, and other signals indicative of alert conditions by predicting whether the approaching vehicles 610A-610C, 612A-612C have sufficient time to brake and stop before passing a predetermined stop line distance 614, 616, for example, from the vehicle 606.

In this example, the radar detection area 602 is divided into multiple zones: mounting offset zones, safety zones, and braking zones. In the mounting offset zones, a mounting offset distance can be defined as a distance from the front radar module 604B installation position to the front edge of the vehicle 606 (MOf); or defined as a distance from the rear radar module 604A installation position to the rear edge of the vehicle 606 (MOr). In the safety zones, a safety zone distance can be defined as a distance from an edge of the front mounting offset zone to the stop line 616 (SZf); or defined as a distance from an edge of the rear mounting offset zone to the stop line 614 (SZr). In general, the safety zone distances (SZf, SZr) can be selected in response to determining a zone in which other vehicles should not enter when the stop arm 608 of a system vehicle is deployed. In some situations, the safety zone distance (SZf, SZr) may be 0, because cars are not allowed to pass the vehicle 606 but might be allowed to stop right behind or right in front of the vehicle 606. In certain embodiments, the front and rear braking zones are generally defined as the areas outside of the front and rear safety zones (respectively). In other embodiments, clearance zone distances (CLZf, CLZr) may be determined and used by the system 101 with respect to operation of the radar modules 604A, 604B to resist generating false alerts during adverse weather conditions such as heavy rain or snow, for example.

Figure 7:
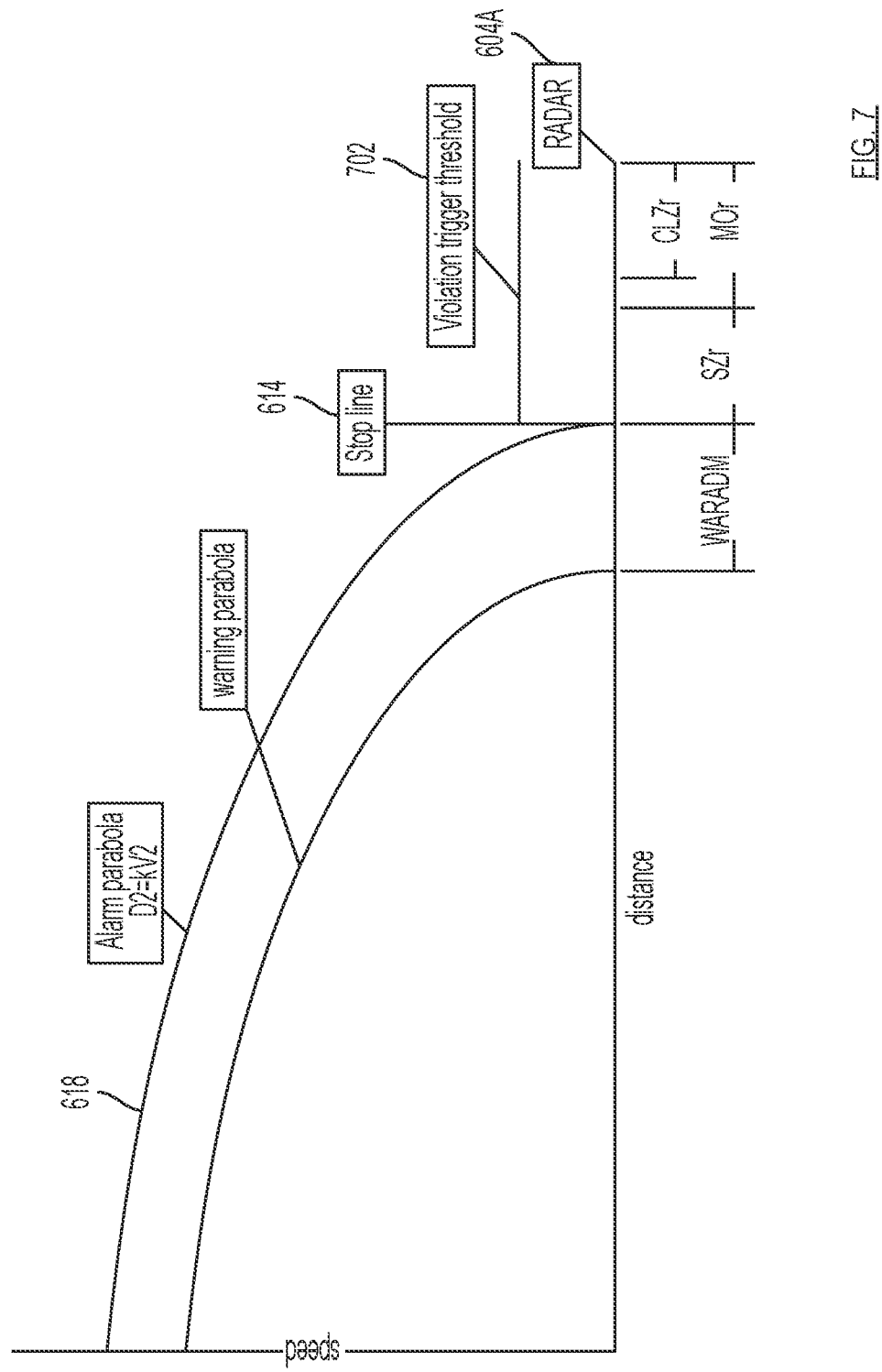
FIG. 7 illustrates an example of a braking curve applied to certain aspects of the radar detection area of FIG. 6.

With reference to FIG. 7, in one example of determining alert trigger conditions, certain algorithms executed in accordance with embodiments of the present invention may assume that a braking curve 618 for the vehicles 610A-610C approximates a parabola defined by the equation $D=kV^2$ (where D is the required braking distance of the vehicle 610A-610C at velocity V, subject to a parabolic coefficient value k). In operation of the system 101, the rear radar module 604A measures a current distance D and velocity V of the target. The algorithms (which can be executed by the SAM module 108 and/or the radar module 614A) calculate a required braking distance B for the target by the formula $B=kV^2$. In certain embodiments, a parameter ALATPC can be defined in the system 101 as the alarm parabola coefficient k; and a parameter WARADM can be defined as a warning parabolic adjustment value. The parabola coefficient may be directly proportional to the ALATPC parameter. In one example, the ALATPC parameter is the braking distance for a vehicle traveling at 100 km/h, so k is calculated as ALATPC/(100^2). It can be appreciated that k can be configurable and adjustable depending on various factors, including mass or type of vehicle, weather conditions, road conditions, or historical accident data, for example, or other factors.

For example, if an algorithm executed by the monitoring and predictive analysis system 101 determines that B>D, then the radar module 614A can output an alarm signal. If the algorithm determines that D> or =B and B>(D−WARADM), then the radar module 614 can output a warning signal. In another version of this calculation, for an approaching vehicle 610A-601C at distance D and velocity V, an alarm signal can be triggered when B>D−SZr−MOr, i.e., if the braking distance B is longer than the vehicle distance D to the rear safety zone. In another example, for an approaching vehicle 610A-610C at distance D and velocity V, a warning signal can be triggered when B>D−SZ−MO−WARADM, where WARADM is a configurable warning adjustment value or distance. That is, a warning signal can be triggered if the braking distance B is longer than the vehicle distance D to the rear safety zone as extended by the WARADM distance value. In these examples, it can be appreciated that the alarm signal can be defined to be comparatively more severe than the warning signal and therefore requires more immediate attention than the warning signal.

In other embodiments, the algorithm may access a data table of reference points such as the data table shown in FIG. 8. In one example, if the front radar module 604B determines that another vehicle is approaching the vehicle at a distance of less than 140 feet from the stop line 616, and at a speed of greater than 46 mph, then a warning signal can be generated and communicated. In another example, if the front radar module 604B determines that another vehicle is approaching the vehicle 606 at a distance of less than 60 feet from the stop line 616, and at a speed of greater than 38 mph, then an alarm signal can be generated and communicated. In this example, the data used to populate the data table of FIG. 8 were calculated using the $D=kV^2$ equation described above.

In other aspects of the invention, if a vehicle or target is detected within any portion of the safety zones or the mounting offset zones, and if the velocity of the target exceeds a predetermined violation trigger threshold 702 (e.g., 15 km/h), then both a violation signal and an alarm signal can be triggered. Since cars and other like vehicles are not allowed in these zones, the violation and alarm signals can be triggered as soon as the target speed is found to be greater than the threshold 702. This speed threshold 702 can be selected based on attempting to resist generating false alert conditions arising from pedestrians, bicycles, and other similar non-threatening or low risk targets traveling through the safety zones or the mounting offset zones.

In another embodiment, the system 101 may adjust different parameters in response to receiving data directly from a target vehicle 610A-610C, 612A-612C via V2V communications (as described above). For example, the system 101 may be programmed to adjust the braking coefficient k in response to determining that a type of vehicle for the target vehicle 610A-610C, 612A-612C is a large truck versus a passenger car, and accordingly calculating a comparatively longer braking distance for the target vehicle 610A-610C, 612A-612C.

Alert conditions may be subject to a priority hierarchy when monitoring and predictive algorithms are executed by the system 101. For example, the priority of an "alarm" signal may be designated as having higher importance or urgency than the priority of a "warning" signal. A "violation" signal may be processed independently of the alarm and warning signals, although the existence of a violation alert condition may also trigger generation of the alarm signal. In another example, if the system 101 detects alarm, warning, and violation alert conditions at the same time, alarm and violation signals can be generated in response to this detected event. If the system 101 detects alarm and violation alert conditions at the same time, then it may output both alarm and violation signals. If the system 101 detects warning and violation alert conditions at the same time, then it might output alarm and violation signals. In another example, if the system 101 detects alarm and warning alert conditions at the same time, then the system 101 may output an alarm signal. Also, if the system 101 only detects an alarm alert condition, then it will output an alarm signal; if it only detects a warning alert condition, then it will output a warning signal; or, if it only detects a violation alert condition, then it will output both alarm and violation signals.

Figure 9:
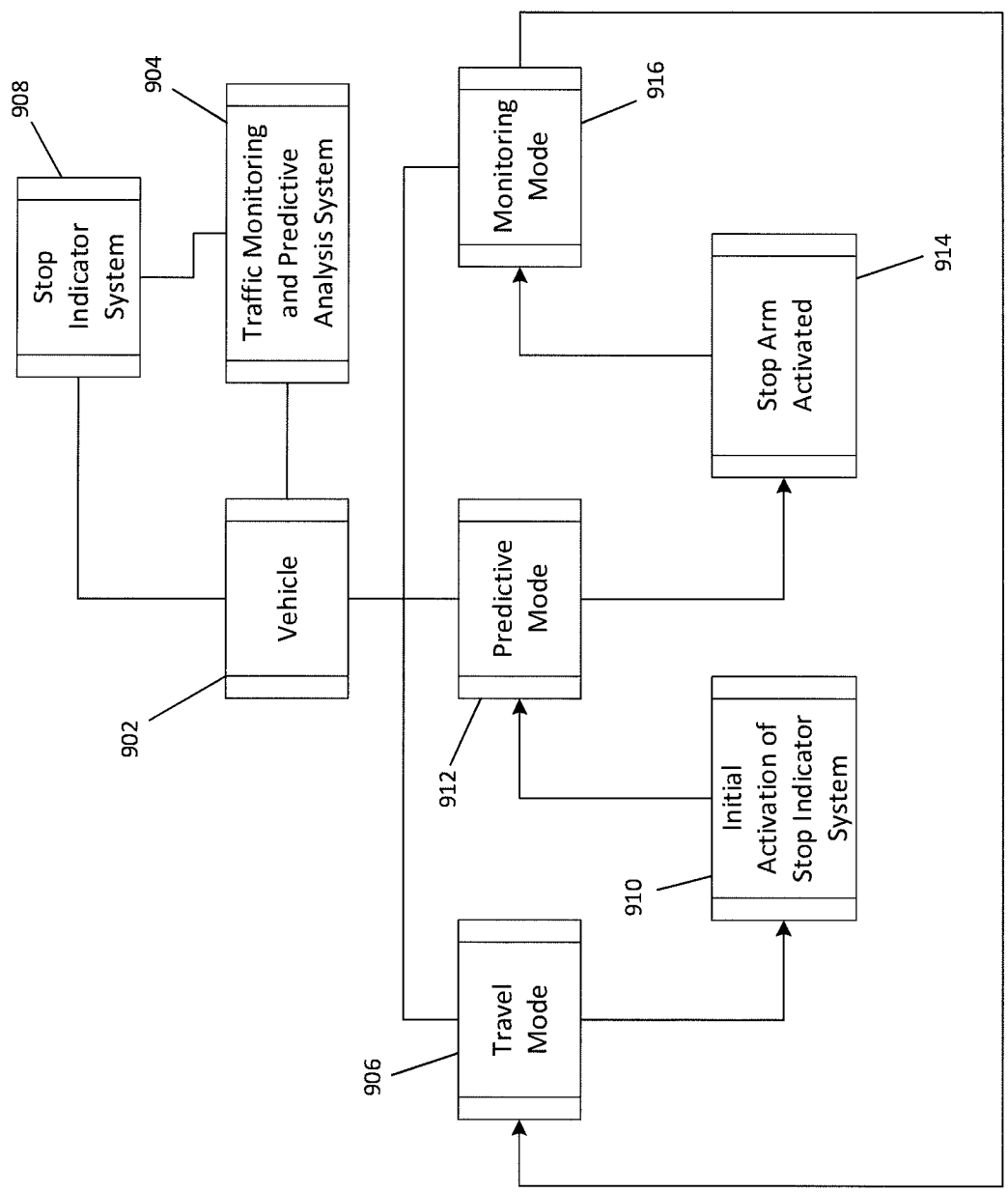
FIG. 9 includes a process flow diagram illustrating certain operational aspects of a traffic monitoring and predictive analysis system configured for use with a stop indicator system of a vehicle.

FIG. 9 includes an example of a process flow diagram illustrating different operating scenarios for a vehicle 902 using a traffic monitoring and predictive analysis system 904 structured in accordance with various embodiments of the present invention. In an operating state 906, the vehicle 902 is in travel mode in which the system 904 is not actively detecting traffic conditions or generating warning or alarms signals, for example. In the travel mode state 906, the vehicle 902 may be moving from location to location (e.g., bus stop to bus stop) or stopped in traffic, for example. When initial or preliminary activation of a stop indicator system 908 operatively associated with the vehicle 902 is detected (e.g., when amber lights are activated) at step 910, the system 904 may enter a predictive mode for the vehicle 902 in operating state 912. In this state 912, the system 904 starts predictive monitoring of radar events to provide warnings to the driver before the stop arm of the stop indicator system 908 is activated, for example (for stop indicator systems which employ stop arms). As described above, the system 904 can generate a warning signal if another vehicle is detected which is approaching the vehicle 902 at a velocity which is faster or from a distance which is closer than permitted, but the vehicle 902 still has time to stop. In predictive mode, a visual warning (e.g., amber color) can be displayed to the driver on a screen display, for example. An audible warning might not be generated for the driver at this stage, perhaps to limit potential distractions for the driver. However, if the system 904 generates an alarm signal by detecting a vehicle which is unlikely to stop in time before passing the vehicle 902, for example, then both a visual warning and an audible warning can be communicated to the driver.

Once the driver determines that traffic conditions in the vicinity of the vehicle 902 are sufficiently safe, then the stop arm of the stop indicator system 908 can be activated at step 914. Thereafter, in operating state 916, the system 904 switches into an active monitoring mode. In this state 916, the system 904 can generate a warning signal if another vehicle is detected which is approaching the vehicle 902 at a velocity which is faster than expected or from a distance which is closer than expected, but the vehicle 902 still has time to stop (see above). A visual warning (e.g., amber color) can be displayed to the driver of the vehicle 902 on a screen display, for example. In addition, audible sounds may be broadcast on the interior speaker and/or exterior speaker of the system 904. The system 904 can generate an alarm signal if it detects another vehicle that is unlikely to stop in time before passing the vehicle 902. In this event, a visual warning (e.g., red color) can be displayed on the screen display, an audible sound can be broadcast for the driver on the interior speaker, and a spoken message can be played on the exterior speaker to warn pedestrians or passengers, for example. After deactivation of the stop indicator system 908, the system 904 can resume travel mode in operating state 906.

With reference again to FIG. 2, in other embodiments a velocity sensor 132 may be configured for communicating signals indicative of the velocity (instantaneous or average speed) of the vehicle 902 to the alarm module 108. The velocity sensor 132 may capture such signals from a communication network (e.g., CAN or J1939) operatively associated with the vehicle 902, for example, or from a global positioning system (GPS) programmed to access the position of the vehicle 902. In one example, the system 904 is programmed to enter the predictive mode at operating state 912 when amber lights of the vehicle 902 are activated at step 910, and data received from the velocity sensor 132 indicate that the velocity of the vehicle 902 is zero or substantially zero.

Figure 10:
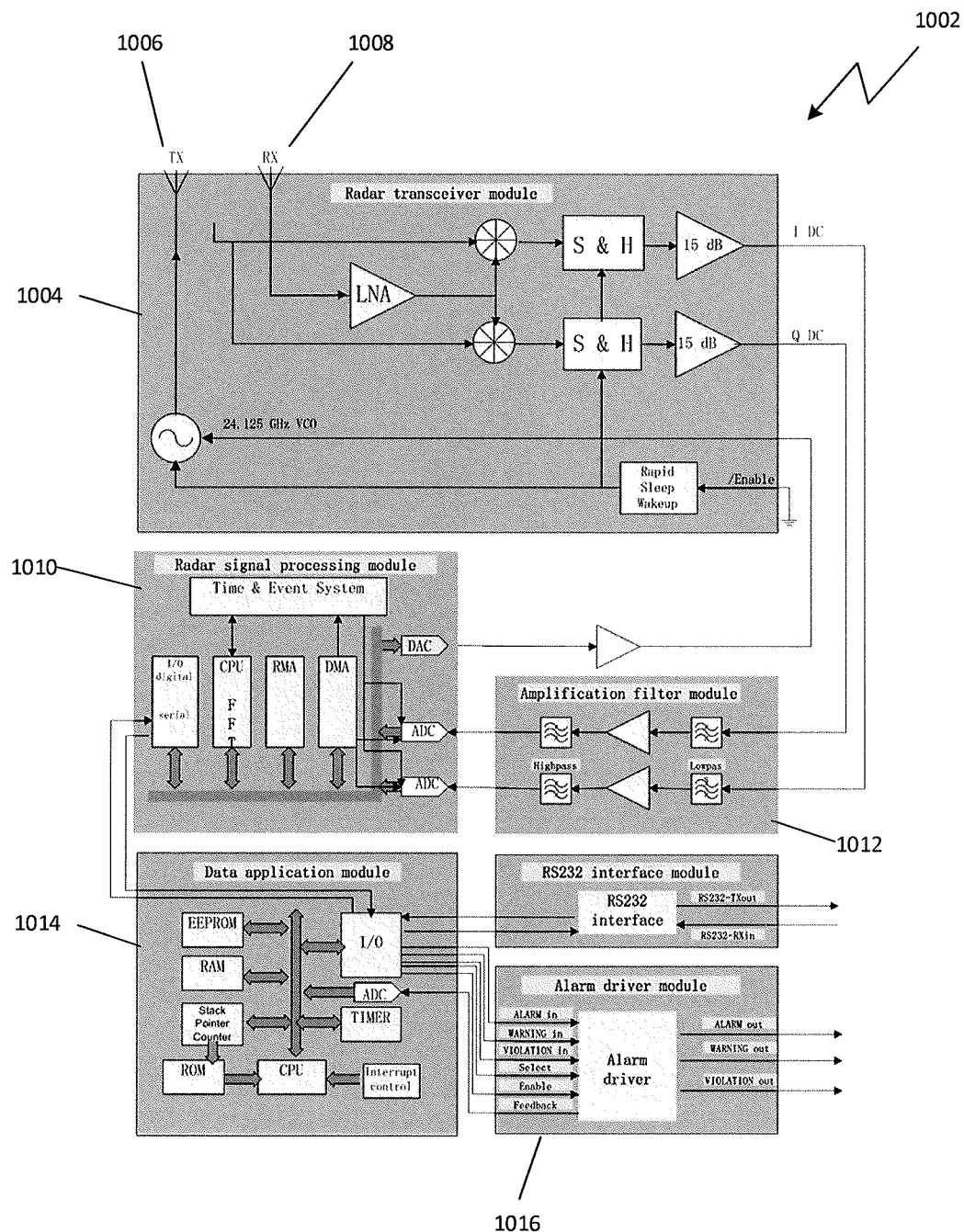
FIG. 10 displays a circuit diagram illustrating one example of a radar module configured in accordance with certain embodiments of the present invention.

FIG. 10 includes a circuit diagram illustrating one example of a radar module 1002 structured in accordance with various embodiments of the invention described herein. In this example, a radar transceiver module 1004 includes a transmission antenna 1006 configured to transmit microwave radio signals into a predetermined radar detection area (see discussion above), and a receiver antenna 1008 to receive signals reflected back from the radar detection area.

Signals received by the radar transceiver module 1004 can then be communicated to a radar signal processing module 1010, after processing through an amplification filter module 1012. The signal processing module 1010 may include a time and event system, for example, which describes radar signals received by the module 1002 and reflects the time and date when they occur. A data application module 1014 may be programmed with one or more algorithms which process data associated with alert conditions arising from the radar detection area, for example. Signals associated with alert conditions (e.g., warnings, alarms, and violations) can be communicated to an alarm driver module 1016, which can be programmed to communicate with an alarm module of a traffic monitoring and predictive analysis system, like those systems described previously herein.

With respect to technical operating parameters of the radar module 1002, it may operate, for example, in a frequency band from 24,000-24,250 MHz; with a field strength (dBμV/m@3 m) of 96.020; a measured bandwidth BW (kHz) (99%) of 440.4; an emission classification (F1D, G1D, D1D) of NON; a transmitter spurious (dBμV/m@3 m) of 60.51 at 48 GHz; and patch antenna up to 100% duty cycle. In various embodiments, a transmission frequency of the radar module 1002 can be anywhere in the microwave range, including at 24 GHz, 72 GHz, or higher frequencies.

In certain embodiments, the radar module 1002 may be programmed with the capability to control its azimuth in association with its mode of installation and/or by controlling the transceiver module 1004. For example, one or more detection parameters can be determined by GPS location data and/or predetermined user specifications. In a fixed azimuth installation, the radar module 1002 can be programmed to detect targets in a defined detection area using predefined parameters, or programming can be altered by adjusting the transceiver module 1004 installation itself. In an adjustable azimuth installation, azimuth parameters can be adjusted electronically and/or automatically in accordance with user specifications or GPS location data (which might be obtained from a GPS type of velocity sensor 132, as described above).

In various embodiments, the radar module 1002 may be programmed with one or more algorithms or other logic which engages in intelligent weather judgment. The radar module 1002 can be programmed for continuously monitoring the number and consistency of targets and radar reflections within the radar detection area. Since water is a reflective substance for radar signals, however, weather events like rain can generate noisy signals or nuisance targets. When the radar module 1002 detects a target pattern that matches rain, for example, the module 1002 can trigger a rainfall adjustment. In one embodiment, a pattern for a given weather condition (e.g., rain) may be retained in a suitable data storage medium for retrieval and comparison against the detected target pattern. In another embodiment, the radar module 1002 can be programmed to trigger adjustments in operating parameters in response to a volume of targets detected in a given radar detection area. A predetermined level or number of targets may be used as a proxy for determining that rain, snow, or another weather condition is impacting the radar detection area.

A similar weather event adjustment can be activated to address false detection problems associated with snow, for example. The radar module 1002 can use algorithms to determine intensity of rainfall, for example, and change configuration parameters in real time. The algorithm allows the radar module 1002 to work in extreme weather conditions and improve alert accuracy. For example, if there is no rain or light rain, CLZ (clearing zone variable) can be modified to 6 m, and VIO (velocity threshold variable) can be modified to 15 km/h. In another example, if there is moderate rain, CLZ can be modified to 10 m, and VIO can be modified to 15 km/h. In a further example, if there is heavy rain, CLZ can be modified to 10 m, and VIO can be modified to 35 km/h.

In certain embodiments, heartbeat and health checks may be performed for the radar module 1002. If the radar module 1002 is available, it can send a heartbeat signal ($READY) every five seconds, for example. The client also can send a health check message (@RADAR \r\n) to check the status of the radar module 1002 when the timer expires. If system status is normal, then the radar module 1002 can reply with a $READY signal, for example, otherwise it can reply with a $RADARINOP signal.

In other embodiments, the radar module 1002 can be programmed to limit its data output. Outputting large amounts of data can be a burden for the radar module 1002 and not necessarily useful to the client or other systems. The radar module 1002 can be programmed to allow customization of its log output rules. For example, data output can configurable in response to desired heartbeat signals, amount of detected data, and relevant alarm signals. Protocols may be developed and configured for querying radar configurations, changing radar parameters, and performing health checks, for example, among other interactions or communications with the radar module 1002.

With reference again to FIGS. 1 and 2, in various embodiments the system 101 may access different kinds of external data or information sources. In one example, the system 101 may collect historical statistics for average target vehicle speed within a certain geographic area, route, or location traveled by the system vehicle 104. The system 101 may be programmed to compare this historical data against an average speed detected by a radar module 110A, 110B for target vehicles traveling in a given location or along a given route. If the detected average speed is less than the historical average speed, it might then be assumed that a change in road or weather conditions warrants an adjustment by the system 101 to the braking coefficient, for example, or other operating parameters.

In other embodiments, the alarm module 108 may be programmed to collect and index alert condition signal data based on GPS location, time, current weather, traffic levels, or other factors. Such statistics may be uploaded to a cloud service 142, for example, to provide useful data about a particular location or travel route for a vehicle. For example, a school district might want to know about the most hazardous portions of the routes traveled by its school buses, perhaps to facilitate changes in routes or other measures that promote enhanced student safety.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, configurations, data definitions, or process flows described herein are necessarily intended to limit the scope of the invention, unless such aspects are specifically included in the claims.

Any element expressed herein as a means for performing a specified function is intended to encompass any way of performing that function including, for example, a combination of elements that performs that function. Furthermore, the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, various models or platforms can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. Wireless communications described herein may be conducted with Wi-Fi and Bluetooth enabled networks and devices, among other types of suitable wireless communication protocols. For vehicle systems, networks such as CAN or J1939 may be employed, for example. For V2V, V2I (vehicle to infrastructure), or V2X (vehicle to everything) communications, technology such as DSRC or 3GPP may be used, for example. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the wireless device to the network. The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a processor or application specific processor.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. Discrete components and features may be readily separated from or combined with the features of any of the other several aspects without departing from the scope of the present disclosure. Any recited method can be carried out in the order of events recited or in any other order which is logically possible.

Unless specifically stated otherwise, it may be appreciated that terms such as "processing," "computing," "calculating," "determining," or the like, refer to the action and/or processes of a computer or computing system, or similar electronic computing device, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by hardware as discussed above, as an alternative the same may also be embodied in dedicated hardware or a combination of software/hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flow charts and methods described herein show the functionality and operation of various implementations. If embodied in software, each block, step, or action may represent a module, segment, or portion of code that comprises program instructions to implement the specified logical functions. The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical functions.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment. The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as" or "for example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as described and claimed herein.

What is claimed is:

1. A system for monitoring and predicting traffic conditions in a vicinity of a system vehicle, the system comprising:
at least one radar module programmed to detect at least one target in a first direction within a predetermined radar detection area;
wherein the radar module is further programmed to:
detect signals associated with a target vehicle traveling through the radar detection area,
generate signals indicative of alert conditions associated with the target vehicle traveling through the radar detection area,
communicate the alert condition signals to an alarm module, and
execute an algorithm for determining when a braking distance of the target vehicle is greater than: a current distance of the target vehicle to a safety zone defined within the radar detection area less a warning adjustment value;
wherein the alarm module is programmed to:
receive the alert condition signals communicated from the radar module,
communicate with at least a portion of a stop indicator system operatively associated with the system vehicle, and,
generate at least one alert event communication in response to at least one of the received alert condition signals, including outputting a warning signal in response to the algorithm determination for the target vehicle.

2. The system of claim 1, wherein the system vehicle comprises a school bus, an articulated bus, a metro bus, or a tour bus.

3. The system of claim 1, further comprising the alarm module programmed to communicate wirelessly with at least one vehicle braking system or vehicle notification system of the target vehicle.

4. The system of claim 1, further comprising:
a camera; and,
visual recognition software programmed to analyze at least one image captured by the camera to determine a type of vehicle for the target vehicle traveling through the radar detection area.

5. The system of claim 1, further comprising the alarm module programmed to receive data from the target vehicle via a vehicle-to-vehicle communication protocol.

6. The system of claim 1, further comprising the alarm module programmed to communicate alert condition information wirelessly to at least one wireless device within the vicinity of the vehicle.

7. The system of claim 1, wherein the radar detection area is divided into multiple zones including at least one mounting offset zone, at least one safety zone, and at least one braking zone.

8. The system of claim 7, further comprising the radar module programmed to generate an alert condition signal in response to detecting a target vehicle in the mounting offset zone.

9. The system of claim 7, further comprising the radar module programmed to generate an alert condition signal in response to detecting a target vehicle in the safety zone.

10. The system of claim 1, further comprising the radar module programmed to generate at least one alert condition signal in response to determining a braking distance for the target vehicle detected in the radar detection area.

11. The system of claim 1, further comprising the radar module programmed to generate the alert condition signal in response to analyzing a braking curve associated with the target vehicle.

12. The system of claim 11, further comprising the radar module programmed to generate the alert condition signal in response to analyzing a braking curve comprising a parabolic braking curve.

13. The system of claim 12, further comprising the radar module programmed to adjust at least one braking coefficient associated with the braking curve in response to at least one vehicle-to-vehicle communication.

14. The system of claim 1, further comprising the radar module programmed to generate at least one alert condition signal in response to determining a velocity of the target vehicle detected in the radar detection area.

15. The system of claim 1, further comprising the radar module programmed to generate at least one alert condition signal in response to determining a current distance, a braking distance, and a velocity of the target vehicle detected in the radar detection area.

16. The system of claim 1, further comprising the radar module or the alarm module programmed to:
execute an algorithm for determining when a braking distance of the target vehicle is greater than a current distance of the target vehicle, and,
output an alarm signal in response to determining that the braking distance of the target vehicle is greater than the current distance of the target vehicle to the safety zone defined within the radar detection area.

17. The system of claim 1, further comprising the radar module programmed to execute an algorithm for:
determining when the target vehicle is within any portion of a safety zone or a mounting offset zone defined within the radar detection area, and,
determining whether a velocity of the target vehicle exceeds a predetermined violation trigger threshold; and
outputting a violation signal and an alarm signal in response to the algorithm determination for the target vehicle.

18. The system of claim 1, further comprising the radar module programmed to adjust at least one parameter in response to a weather condition detected within the radar detection area.

19. The system of claim 18, further comprising the radar module programmed to adjust at least one parameter in response to rain or snow occurring within the radar detection area.

20. The system of claim 1, further comprising the alarm module programmed to receive data communicated from at least one velocity sensor.

21. The system of claim 1, further comprising the alarm module programmed to receive data from at least one external data source comprising historical statistics for average target vehicle speed.

22. The system of claim 21, further comprising the radar module programmed for:
  comparing the historical average target vehicle speed to a detected target vehicle speed; and,
  adjusting at least one parameter of the radar module in response to comparing the historical average target vehicle speed to the detected target vehicle speed.

23. The system of claim 1, further comprising the alarm module programmed for collecting and indexing alert condition signal data based on at least one of location, time, current weather, or traffic level in the vicinity of the system vehicle.

24. A system for monitoring and predicting traffic conditions in a vicinity of a system vehicle, the system comprising:
  at least one radar module programmed to detect at least one target in a first direction within a predetermined radar detection area;
  wherein the radar module is further programmed to:
    detect signals associated with a target vehicle traveling through the radar detection area,
    generate signals indicative of alert conditions associated with the target vehicle traveling through the radar detection area, and
    communicate the alert condition signals to an alarm module;
  wherein the alarm module is programmed to:
    receive the alert condition signals communicated from the radar modules,
    communicate with at least a portion of a stop indicator system operatively associated with the system vehicle,
    generate at least one alert event communication in response to at least one of the received alert condition signals,
    receive data communicated from at least one velocity sensor, and
    enter a predictive mode when amber lights of the vehicle are activated and data received from the velocity sensor indicate that a velocity of the system vehicle is zero or substantially zero.

* * * * *